March 31, 1931. H. J. SHELTON 1,798,814
PNEUMATIC DISCHARGE PAN
Filed Feb. 26, 1930
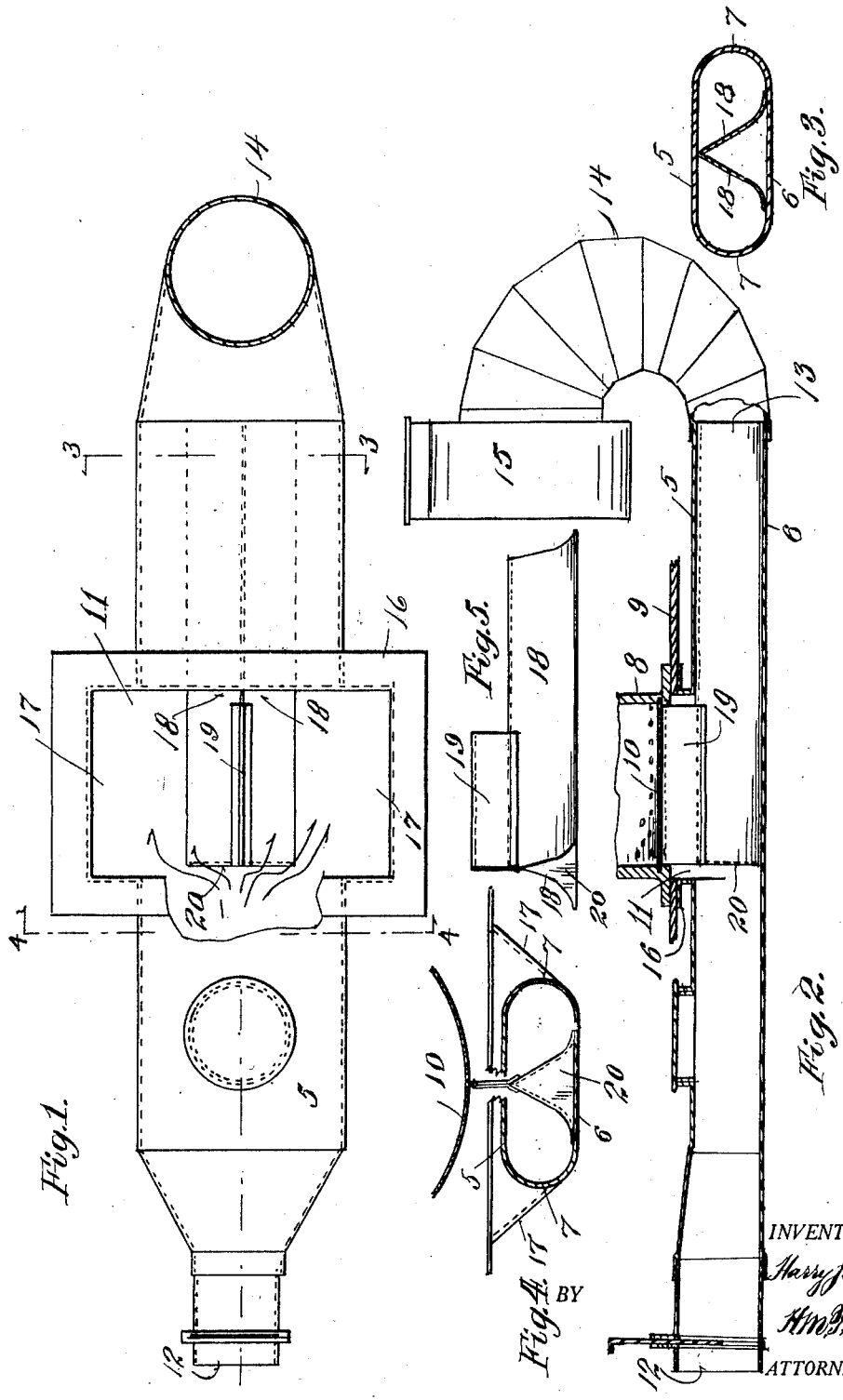

Patented Mar. 31, 1931

1,798,814

UNITED STATES PATENT OFFICE

HARRY J. SHELTON, OF UNIVERSITY CITY, MISSOURI

PNEUMATIC DISCHARGE PAN

Application filed February 26, 1930. Serial No. 431,440.

This invention relates to certain new and useful improvements in pneumatic discharge pans for grist mills and the like, the peculiarities of which will be hereinafter fully described and claimed.

The main objects of my invention are first, to improve the discharge by vehicle air currents of ground material delivered to a horizontal pan below a grist mill for instance; secondly, to divide said air currents and direct them to the places in said pan where such material is liable to lodge in changing from vertically disposed to horizontally disposed currents of air laden material; thirdly, to form multiple conduits with constricted bottom and larger top for a suitable distance from the mill towards the exhaust fan, adapted to aid the air currents in picking up and carrying the descending material and avoiding its lodgment on the pan bottom; fourthly, to increase the velocity of such material-carrying air currents to aid in lifting them to the higher level of the exhaust fan; and fifthly, to provide suitable construction for carrying out the above objects.

In the accompanying drawing in which like reference numerals indicate corresponding parts, Fig. 1 represents a plan view of a discharge pan exemplifying my invention;

Fig. 2, a vertical longitudinal section through the center of said pan with the lower portion of a mill and its screen and a fan cooperating therewith;

Fig. 3, a cross section on the line 3—3 of Fig. 1;

Fig. 4, a cross section on the line 4—4 of Fig. 1; and

Fig. 5, a perspective view of the preferred form of my insert partition by itself.

The numerals 5 and 6 designate respectively the top and bottom walls and 7 the side walls preferably semicircular, of a discharge pan horizontally disposed beneath a grist mill or other reducing machine 8 that is supported on a base 9, as indicated in Fig. 2. The mill has an arcuate screen bottom 10 through which the ground material is discharged into said pan through a top inlet 11 intermediate the end 12 adapted for air inlet, and the outlet end 13 connected by a pipe 14 to a fan 15 as illustrated in Fig. 2.

The top inlet 11 has flanges 16 by which it is secured to the base portion 9, and is connected by inclined side walls 17 with the semicircular wall 7 of the portions of said pan extending on each side of the top inlet.

A wide flattened chamber is thus formed with a top inlet for receiving the grist or other ground material as it descends from said outlet screen and is picked up by the horizontal air currents passing below said screen to the outlet and fan. These air currents serve as a vehicle to carry the ground material out of the pan, into the fan and thence to a suitable storage or other place.

When the ground material descending from said screen is comparatively heavy or in large quantities, it is liable to lodge on the bottom of the pan before it can be picked up and carried through the outlet 13 to the exhaust fan. Heavy feeding of material to said mill is liable to make, temporarily, an excess quantity of ground material that is liable to lodge on the bottom of the pan. I therefore provide means for increasing the velocity of the vehicle air currents where such velocity is most needed,—that is, in the pan directly below the mill screen.

My preferred means consist of two or more walls 18, preferably inclined and meeting at the top where they engage on wall 5. The bottom portion preferably curved to form a continuation of the semicircular side walls 7, as shown in Fig. 3. These partition walls thus form two or more conduits extending from the outlet 13 backward and under the top inlet 11 where an upward extension or rider continues said inclined partitions vertically upward toward or in contact with the screen 10. These inclined walls are connected by a cross wall 20, Figs. 4 and 5, which opposes the currents from the air inlet and deflects them laterally into the several conduits formed by said partition walls as above described. Any other spreading device may be used as an equivalent to said end wall 20, whereby the air currents are divided and deflected directly to the bottom portions of the pan below the screen.

These inclined partition walls and intervening space reduce by that much the cross sectional area of the pan from the screen towards the outlet. This reduction of area with constant air suction of the fan, increases the velocity of air currents carrying the ground material so that such material is carried through said conduits and upward into said exhaust fan and is less liable to lodge on the bottom of the pan than if said partitions were not in place. The semicircular bottom of each conduit by its constricted narrow cross section and its wider upper portion, facilitates the passage of material-carrying currents through the conduit. Even with old pans it is an easy matter to provide and insert these inclined meeting partition walls with closing end wall 20 and the rider extension, and secure greater efficiency in handling the discharge from said mill. By actual test the partial vacuum within said pan is increased from 5¼ inches to 7½ inches of water level, and the danger of a certain rush of descending material lodging on the pan bottom before it can be picked up by the air currents, is largely or wholly avoided.

It will be observed that the air inlet may be regulated in size and corresponding quantity of air traveling horizontally which air is deflected laterally and combines with the air accompanying the vertically descending ground material from said screen.

I claim:

1. A discharge pan consisting of walls forming a wide flattened chamber having an air inlet at one end, an outlet section subject to air suction at the other end, and an intermediate top inlet for ground material,—said chamber being provided with central partitions having an end wall opposed to the entering air currents, substantially as described.

2. A discharge pan consisting of walls forming a wide flattened chamber horizontally disposed having an air inlet at one end, an outlet subject to air suction at the other end, and an intermediate top inlet for ground material,—said chamber being provided with inclined partitions extending from said outlet back under said top inlet and having an end wall opposed to the entering air currents, substantially as described.

3. The combination with a mill having a screen bottom outlet for ground material, of a discharge pan consisting of walls forming a wide flattened chamber having a top inlet below said screen located between an air inlet and an outlet subject to air suction and provided with multiple partitions located under said top inlet and extending towards said outlet, substantially as described.

4. The combination with a mill having a screen bottom outlet for ground material, of a discharge pan consisting of walls forming a wide flattened chamber with semicircular side walls and having a top inlet below said screen located between an air inlet and an outlet subject to air suction and provided with inclined partitions oppositely curved in their lower portions to cooperate with said sides and forming conduits, substantially as described.

5. The combination with a mill having a screen bottom outlet for ground material, of a discharge pan consisting of walls forming a wide flattened chamber having a top inlet below said screen located between an air inlet and an outlet subject to air suction,—said chamber being provided with two inclined meeting partitions extending under said top inlet and upward therein towards said screen, and a connecting cross wall opposed to the air currents adapted to divide and deflect them laterally, substantially as described.

6. The combination with an exhaust fan and a mill having a screen bottom outlet for ground material, of a discharge pan having a top inlet for said material and connected by its outlet end to said fan,—said pan having partition walls forming multiple conduits having a combined area less than the fan inlet adapted to increase the normal velocity of material-carrying currents from said mill to the fan, substantially as described.

7. The combination with a mill of the character described having a screen outlet, and an exhaust fan, of a discharge pan consisting of walls forming a wide flattened chamber horizontally disposed below and communicating with said mill and having an air inlet at one end and an outlet at the other end communicating with said fan, and provided with inclined meeting partitions extending back from the outlet under and up to said screen forming separate conduits and having an end wall connecting said partitions adapted to deflect air currents laterally,—the cross area of said chamber being reduced by said partitions and intervening space and the velocity of the air currents increased as they are divided and deflected laterally below said screen, substantially as described.

In testimony whereof I have affixed my signature.

HARRY J. SHELTON.